_United States Patent Office_ 3,040,784
Patented June 26, 1962

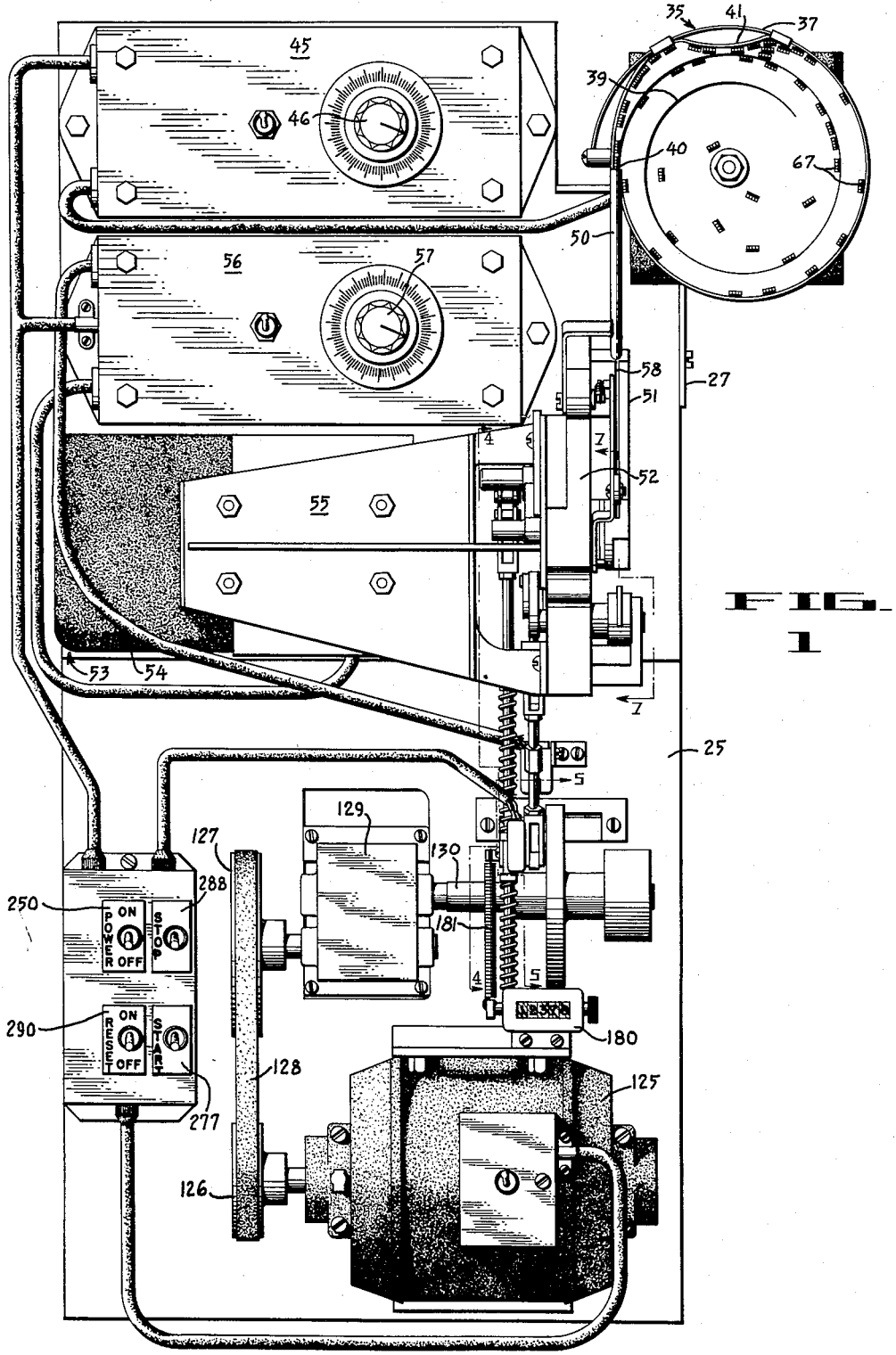

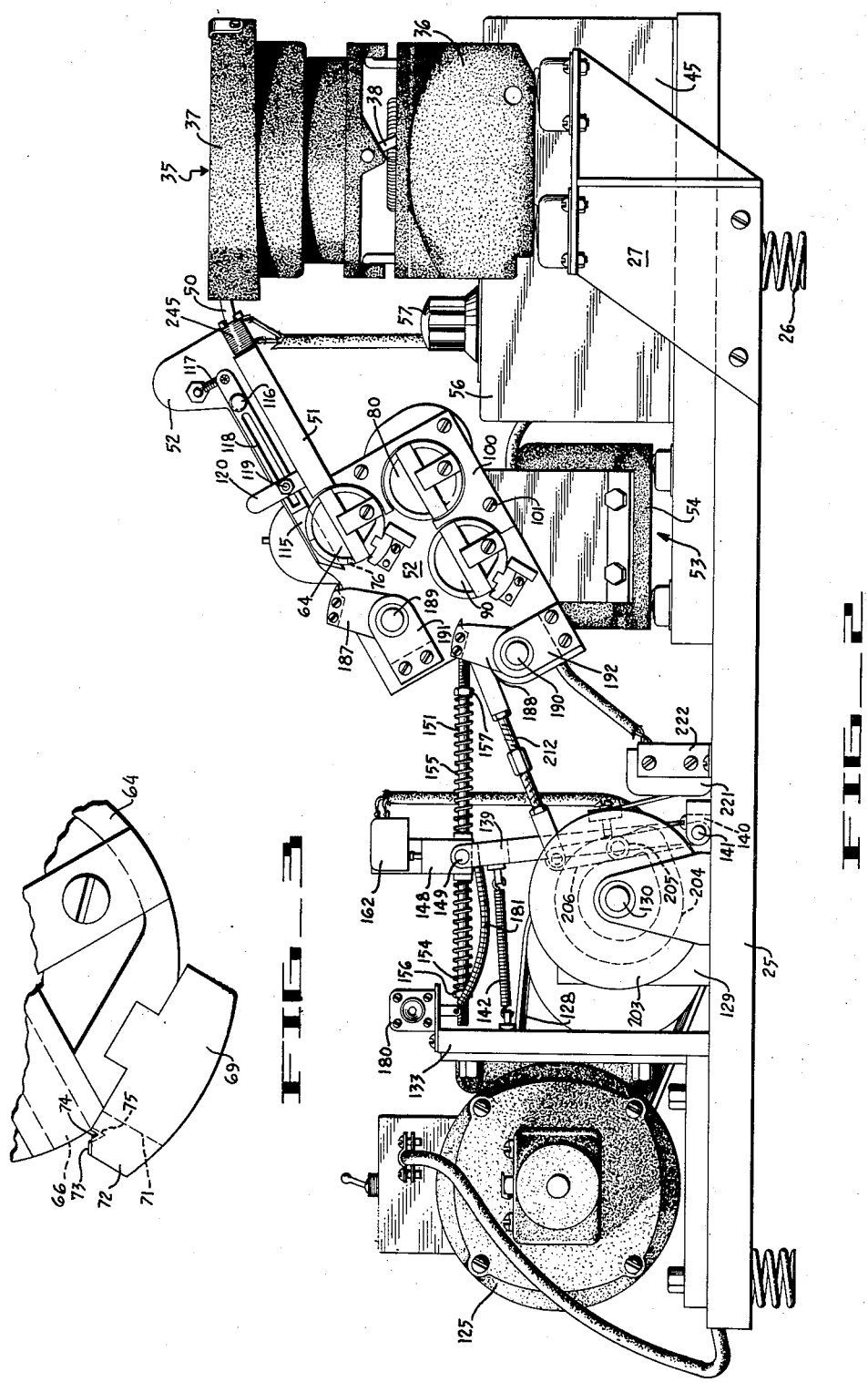

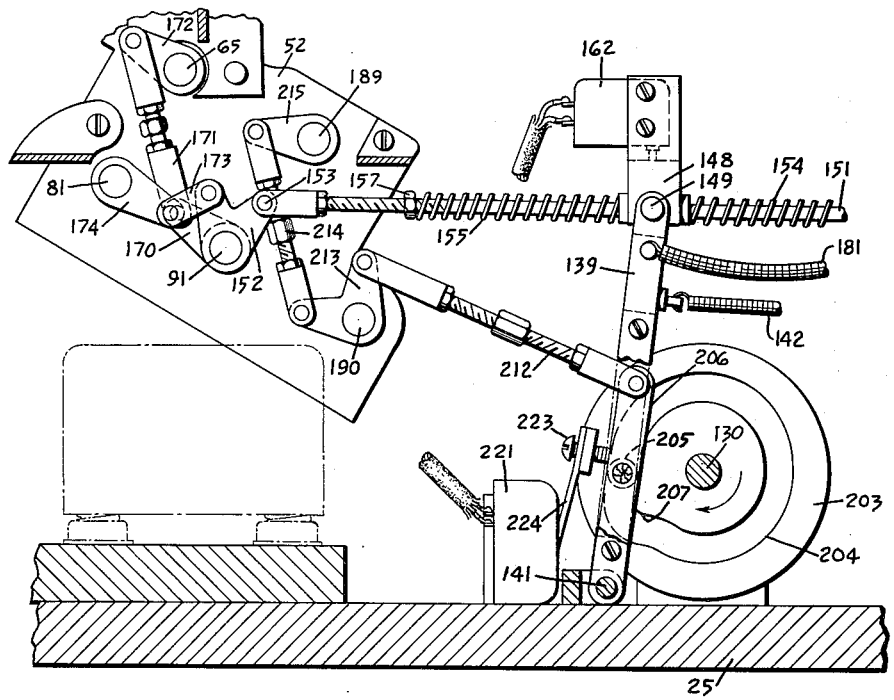
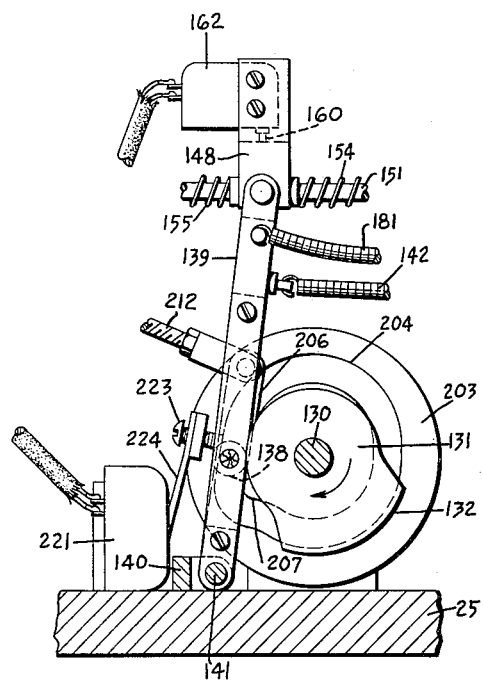
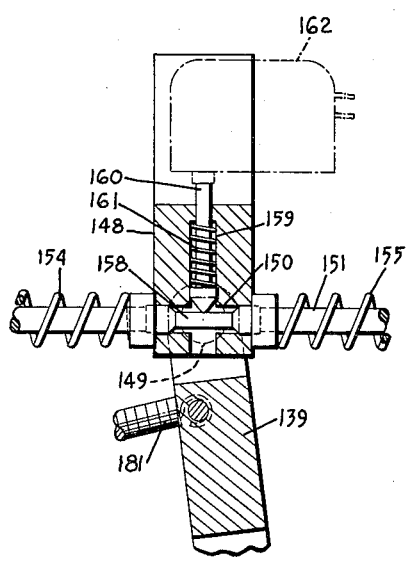

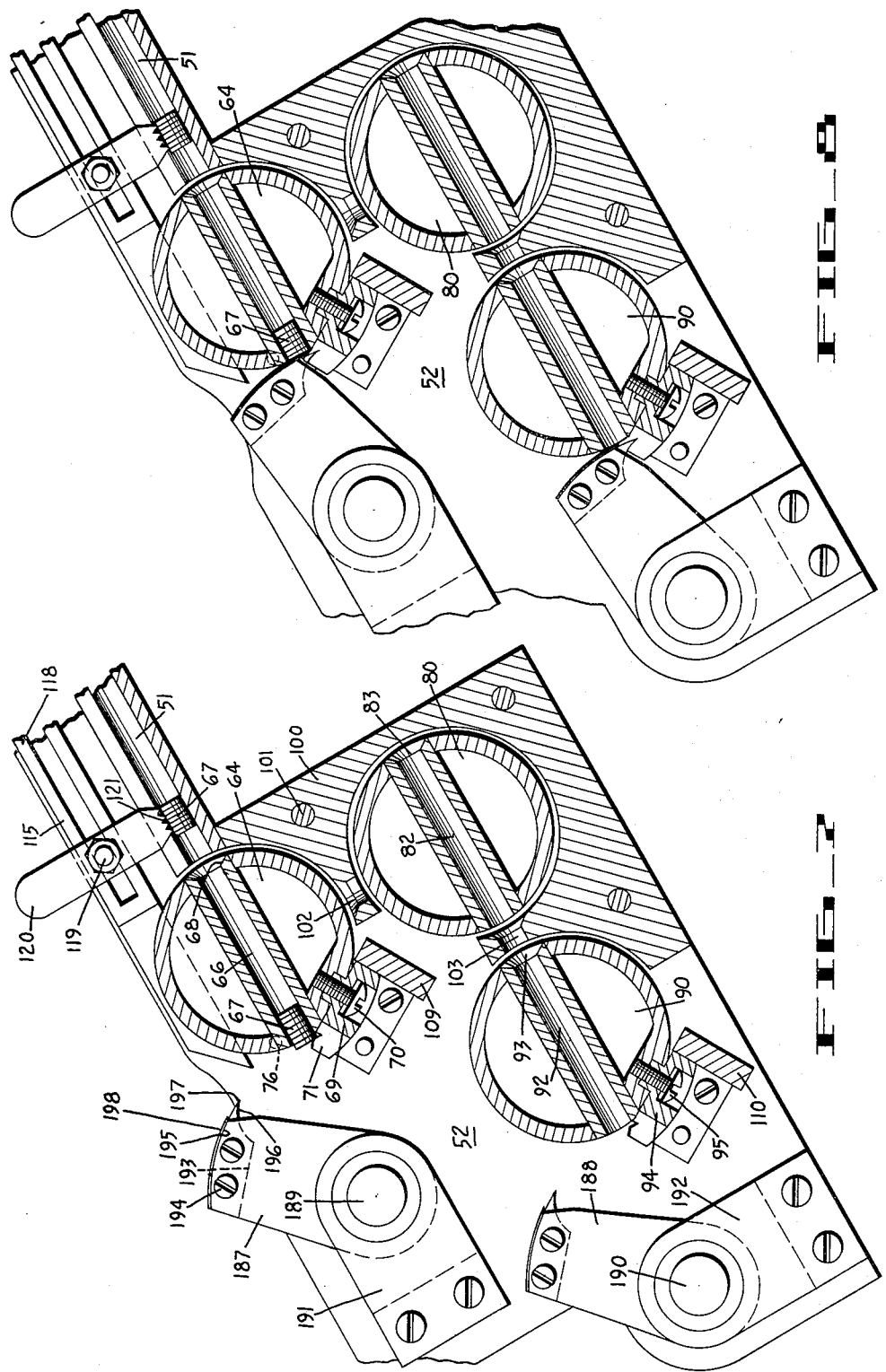

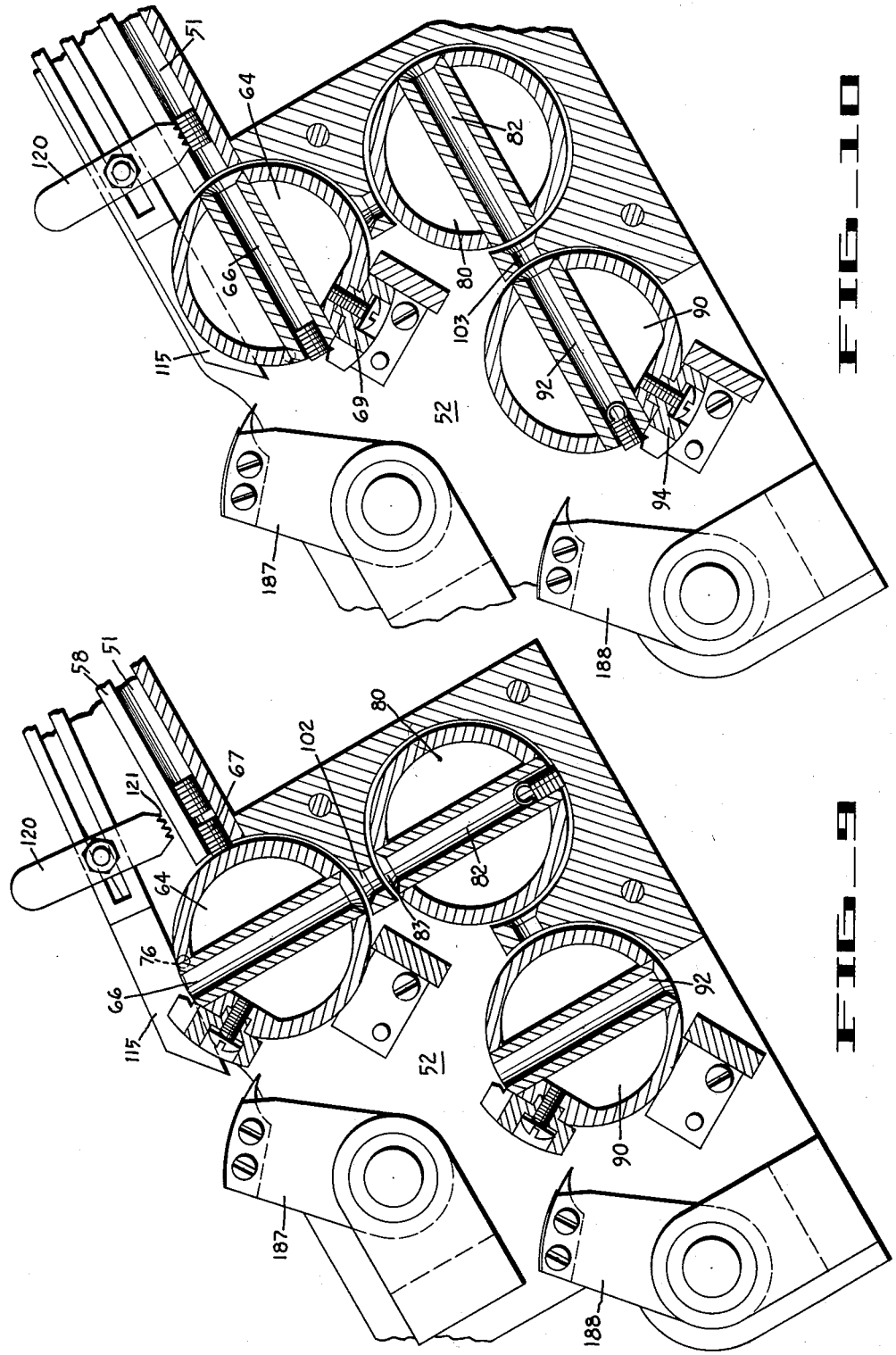

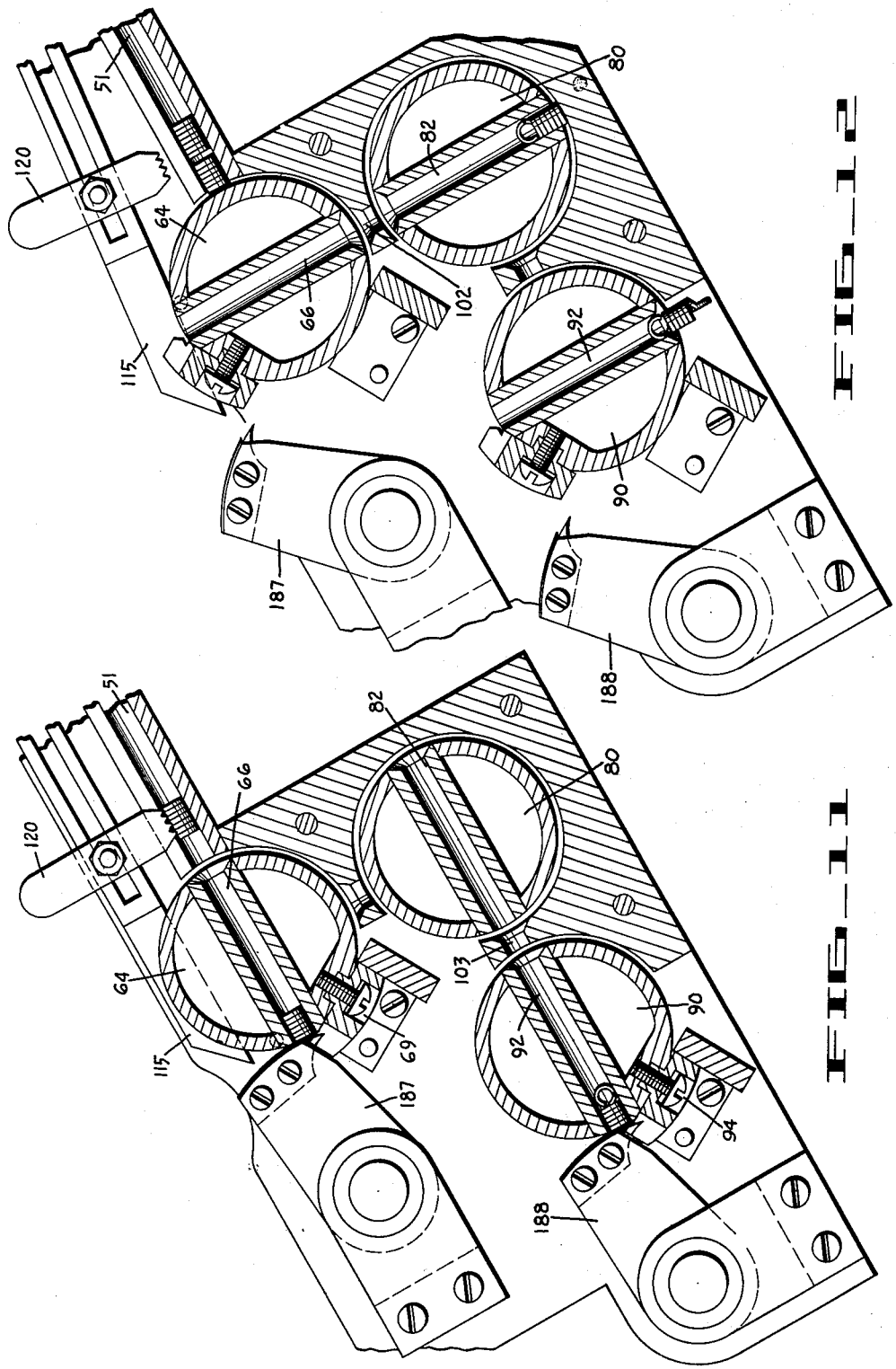

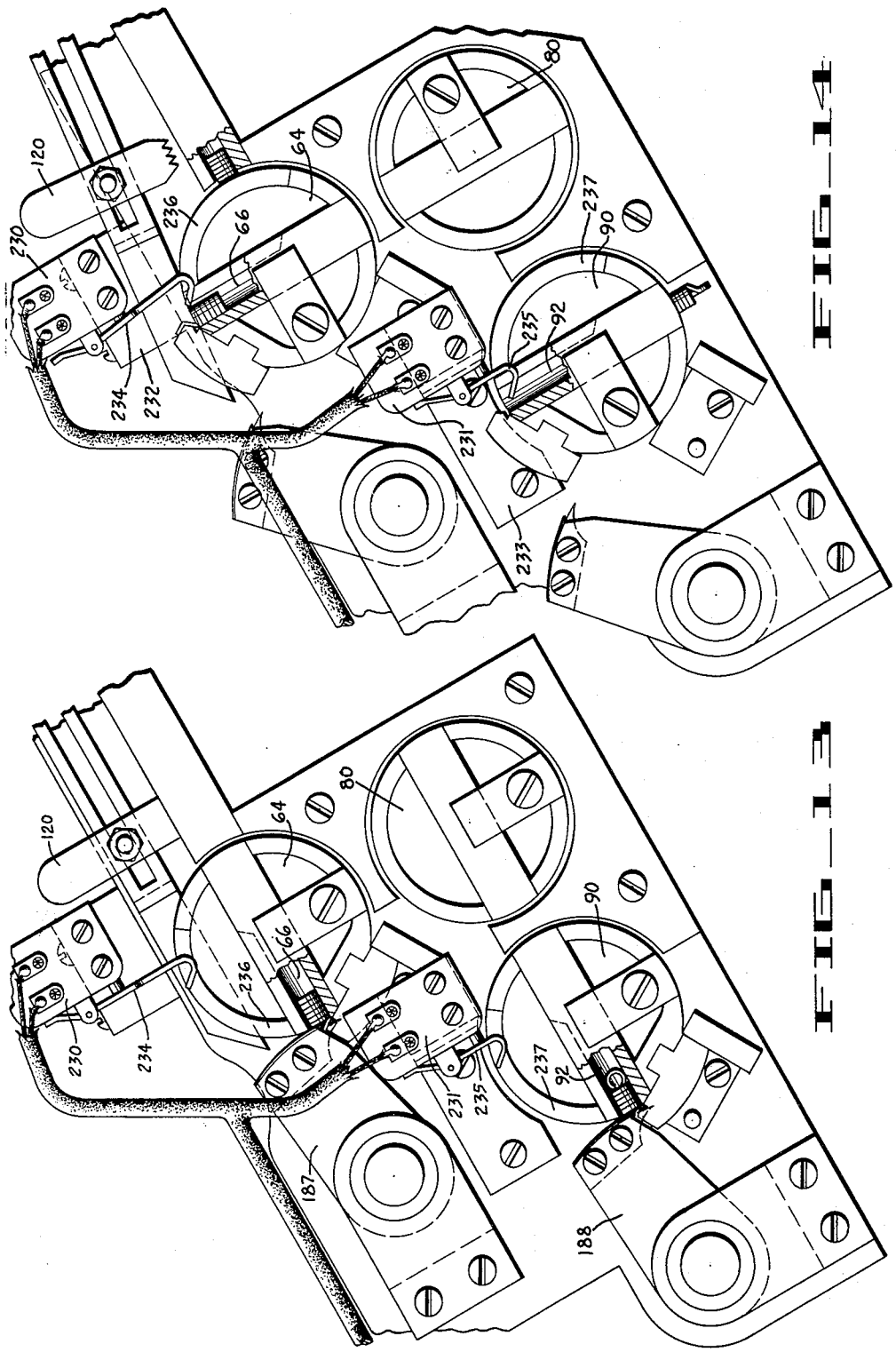

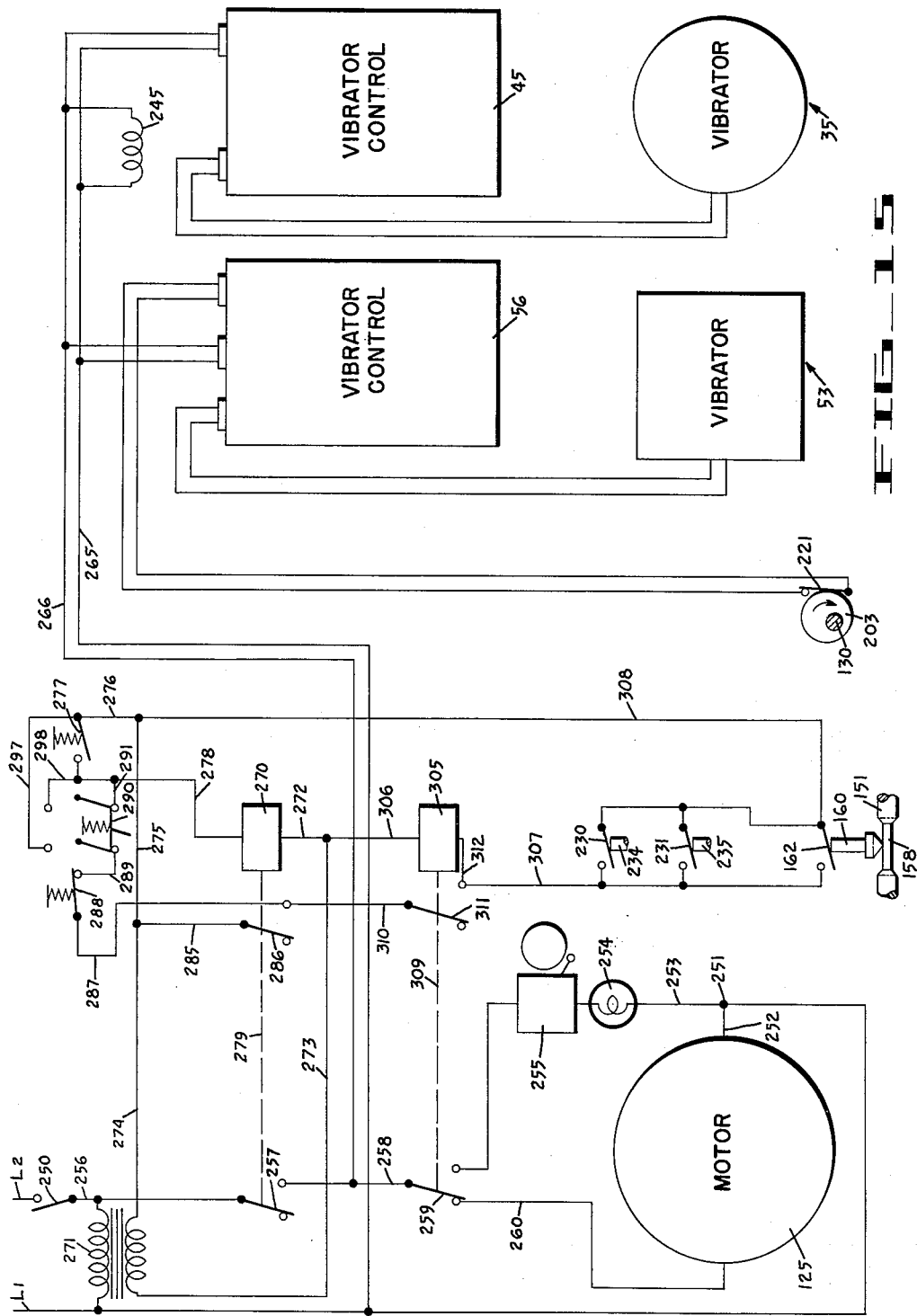

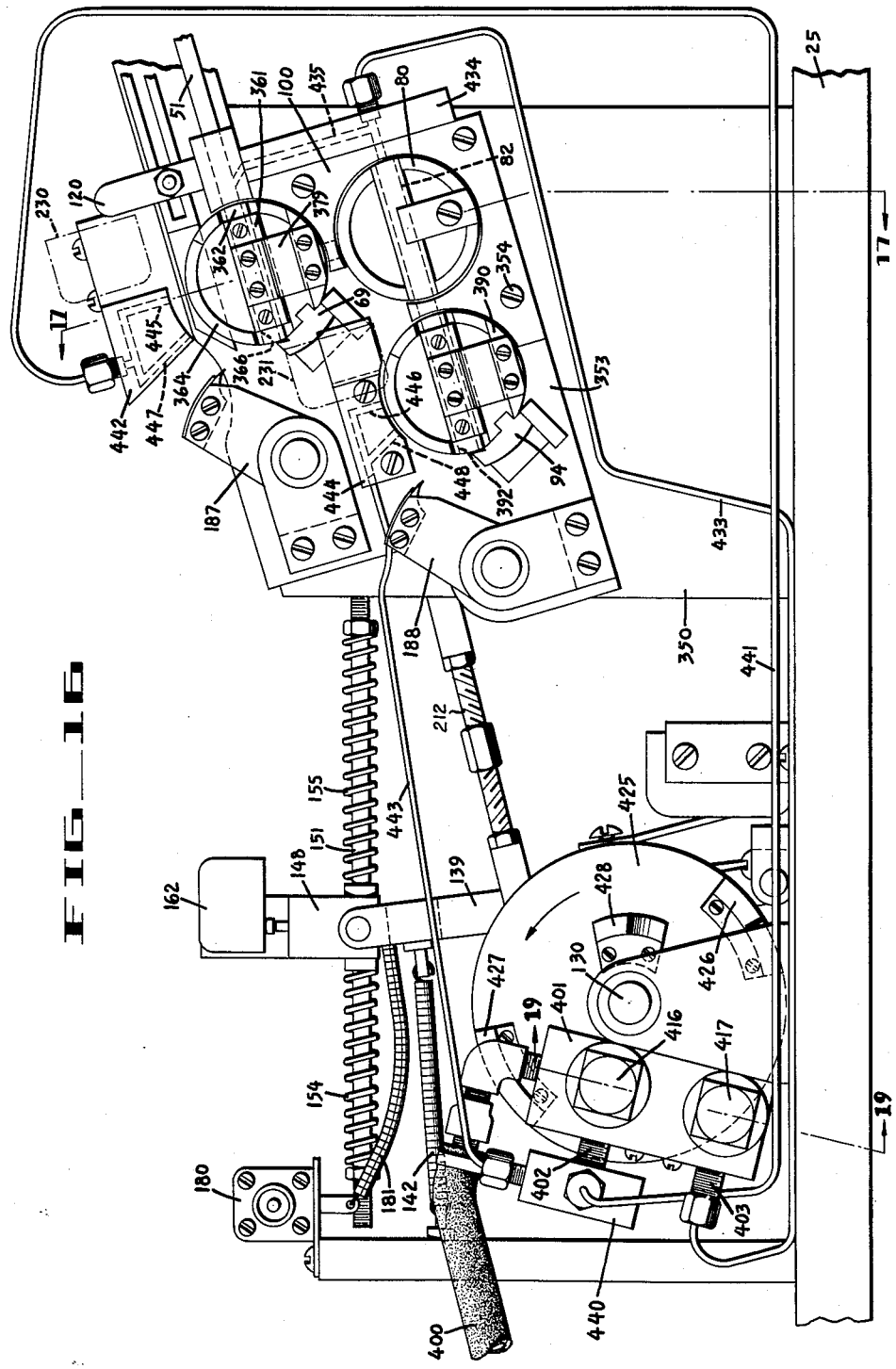

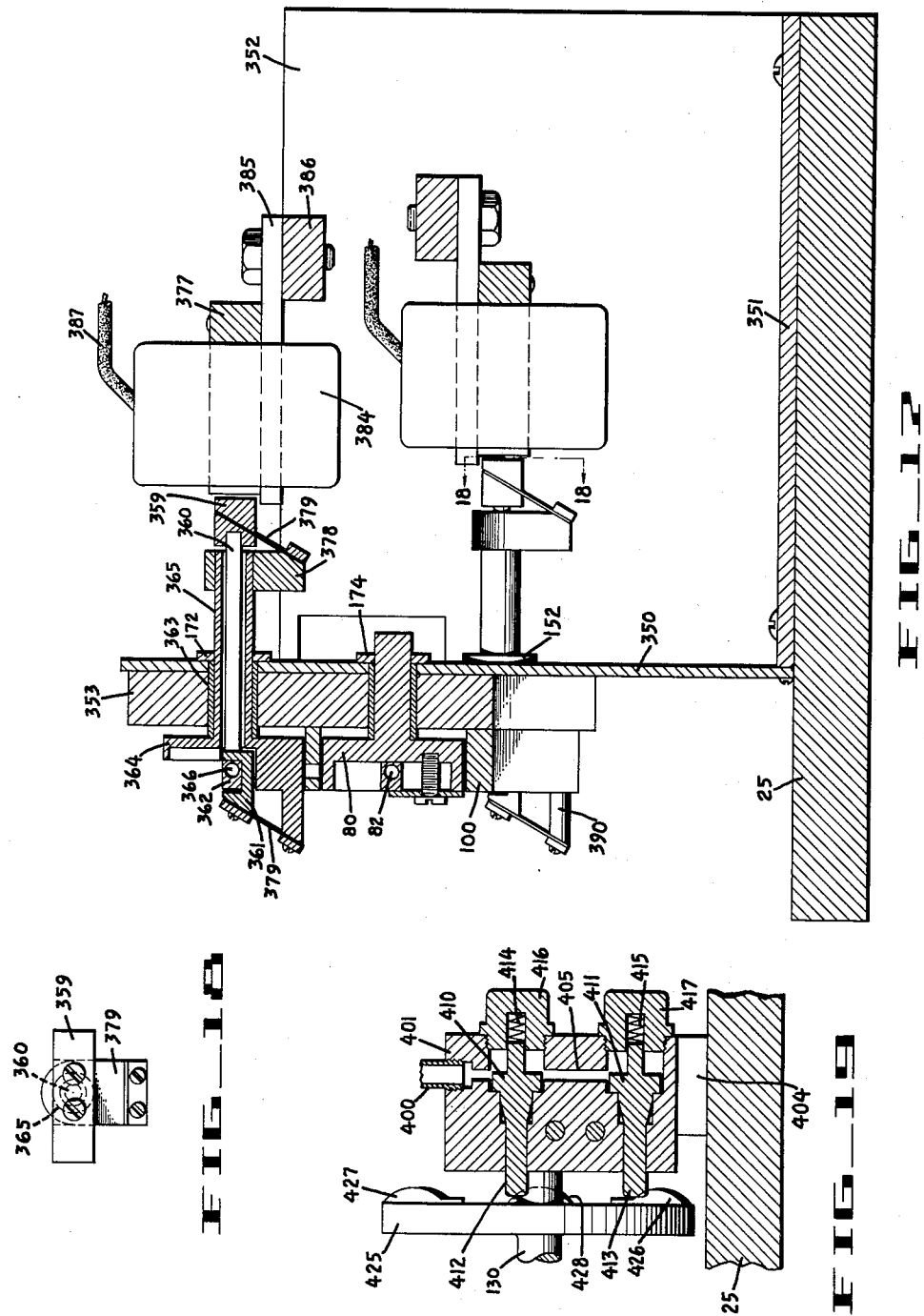

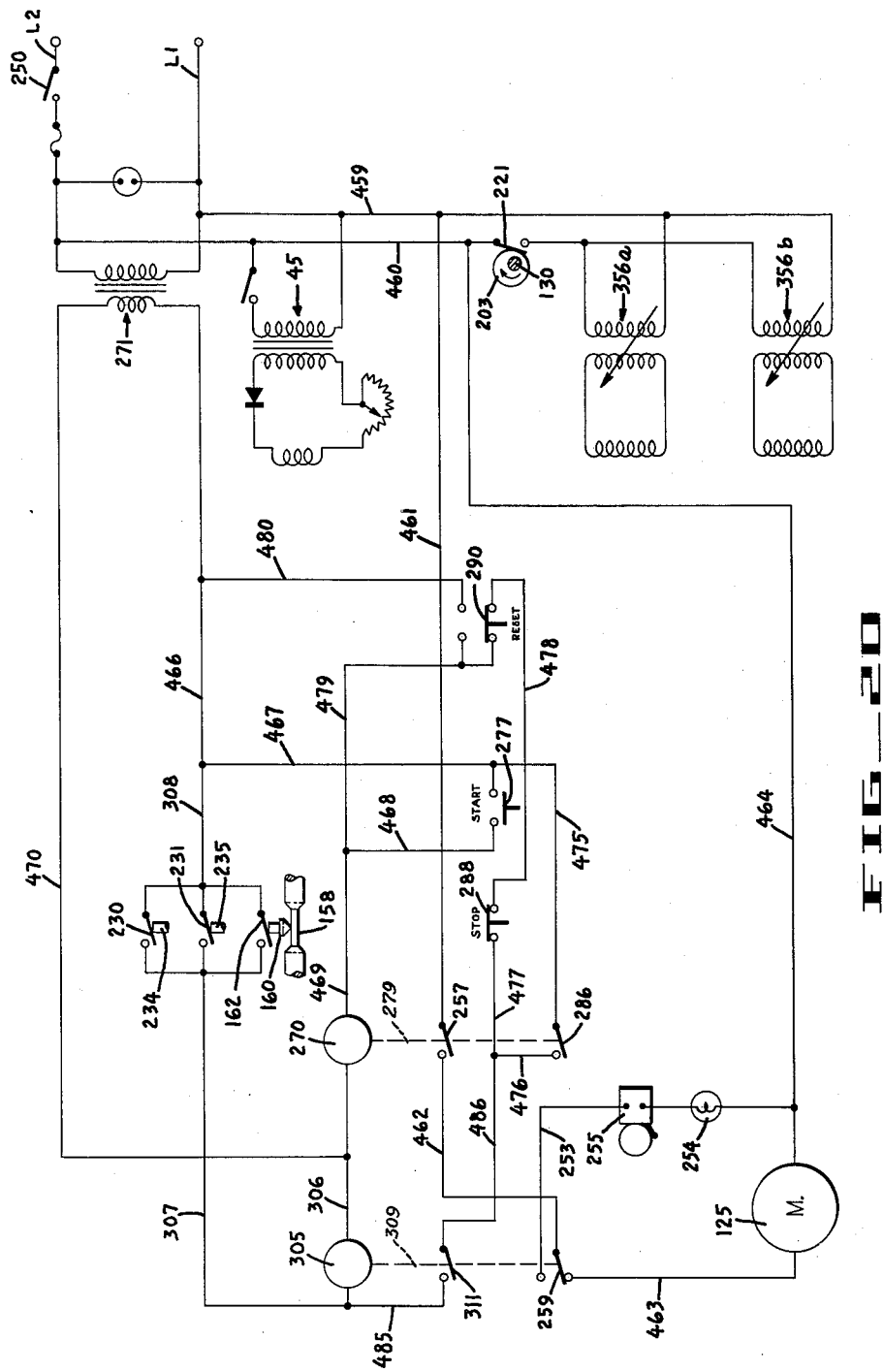

3,040,784
AUTOMATIC SPRING LOOPING MACHINE
Herbert Henry Ashley-Wing, San Francisco, Calif.,
assignor to Friden, Inc., a corporation of California
Filed Dec. 30, 1958, Ser. No. 785,106
15 Claims. (Cl. 140—103)

This application, which is a continuation-in-part of my application, S.N. 733,022, filed May 5, 1958, and abandoned January 29, 1959, in favor of the present application, relates to an invention for an automatic spring-looping machine, by which is meant a machine that automatically forms connecting loops in the end of precoiled springs.

The primary object of the present invention is to provide a device suitable for automatically forming accurately sized loops in the ends of coil springs, and particularly those of relatively small size.

In the past it has been necessary, in forming a connecting loop in relatively small springs, such as those used in office equipment, to form the loops individually and by hand, for there was no commercially practical machine available for automatically and accurately forming these loops. These connecting loops, in most instances, should be one full circle of the spring wire, no more, and no less. To take less than a full turn of the spring renders the springs likely to slip off of their respective seats, and the taking of more than one loop took too much of the spring for loops, thereby changing the force of the spring and sometimes making it difficult to seat them. For example, in certain of the figures of the drawings, are shown springs being treated which contain seven turns as they come from the spring-forming machine. If the two end turns are formed as loops, it leaves a spring of five turns. To take an extra turn in one of the loops would make a difference of twenty percent in the contracted length of the spring, with a corresponding difference in its strength and in its limit to which it could be stretched. This particular spring is used in large numbers in one of the leading makes of calculators, and a change of such characteristics in these springs would affect the overall operation of the machine, perhaps to the extent of causing errors. For this reason it has been necessary, in forming the small springs, to form the springs on a spring-forming machine, then take the unlooped springs to "loopers," i.e., workers who manually, and one at a time, form the loops in the springs by using manual machines. This method is expensive and is hard on the operators, most of whom eventually have trouble with their eyes because of the exactness of the work. One of the primary purposes of the present invention, therefore, is to provide an automatic spring-looping machine which accurately and rapidly, and automatically, forms loops in the ends of springs.

Another primary object of the invention is to provide a means for properly positioning a spring in which a loop is to be formed, so that the end loop will be of exact size in all springs. For example, in the illustration shown to exemplify the present invention, the loops will be one complete turn, and no more and no less; but it will be understood that loops of any desired number of turns could be formed equally well.

These and other objects of the present invention will be apparent from the description and claims which follow, and they, in turn, will be more readily understood by reference to the accompanying drawings in which:

FIG. 1 is a plan view of the automatic spring-looping machine of one embodiment of the present invention.

FIG. 2 is a side view of the machine shown in FIG. 1.

FIG. 3 is a detail view, on an enlarged scale, of one of the turrets of the present invention, showing in particular, the formation of the anvil upon which the loop is formed.

FIG. 4 is a partial side view, on an enlarged scale, of the cam and associated mechanism which controls the operation of the loop-forming tools, such as along the planes indicated by the lines 4—4 of FIG. 1.

FIG. 5 is a side view, on an enlarged scale, of the cam and related mechanism which controls the operation of the turrets, the view being taken on a plane to the right of that of FIG. 4, such as being taken along the planes indicated by the lines 5—5 of FIG. 1.

FIG. 6 is an enlarged detail of the overload switch which is operative, in the event of a jamming, to stop operation of the machine.

FIG. 7 is an enlarged detail of the turrets and forming tools, showing a spring positioned to have a loop formed in one end, such as taken along the planes indicated by the lines 7—7 of FIG. 1.

FIG. 8 is similar to FIG. 7, but showing the forming tools in their operative position to form the loops on the ends of the spring.

FIG. 9 shows the turrets operated through an angle of approximately 90° in order to shift the spring from one turret to another.

FIG. 10 is similar to FIG. 7, except that it shows the first spring in reversed position in the second forming turret in order to have a loop formed in the other end.

FIG. 11 is similar to FIG. 8, and shows the forming tools in their operative position.

FIG. 12 shows the turrets in their rotated position in which the spring in the second forming turret is being dropped (into a receiving container) and that in the first forming turret is being transferred to the second.

FIG. 13 is similar to FIGS. 8 and 11, but shows a safety device which is effective to stop the machine in the event a loop is deformed in the forming operation so that it cannot be transferred from one turret to another.

FIG. 14 is similar to FIG. 13, with the turrets in their extreme second position, and showing the operation of the safety switch when a loop is deformed so as to prevent ejection of a formed spring.

FIG. 15 is a wiring diagram of the machine of the first embodiment of the present invention.

FIG. 16 is a side view of a second embodiment of my invention, a form which is particularly suitable for very small and light springs.

FIG. 17 is a cross-sectional view of the machine shown in FIG. 16, and shows particularly the mounting of the forming turrets of the second form of machine, being taken along the planes indicated by the lines 17—17 of FIG. 16.

FIG. 18 is a detail of the interior mounting of the vibrating turrets, such as taken along the plane indicated by the line 18—18 of FIG. 17.

FIG. 19 is a detailed cross-sectional view on an enlarged scale, of the air valve and its operating cam, such as taken along the plane indicated by the line 19—19 in FIG. 16, and, FIG. 20 is a wiring diagram of the machine shown in the second embodiment of the present invention.

*First Embodiment*

The mechanism of the first embodiment of the present invention is mounted on a suitable base plate 25. This base plate is provided with suitable vibration absorbing legs 26, such as the compression springs shown in FIG. 2, for the mechanism is subject to considerable vibration, and, in ordinary circumstances, it is desired to isolate this vibration from the surroundings of the machine. The basic elements of the machine are mounted upon this base plate 25, these basic elements comprising a vibrating hopper feeder 35, a vibrator trough feeder 53, their respective controllers 45 and 56, a motor 125, and a drive mechanism including a gear box 129, a drive shaft 130, cams mounted on the drive shaft, and cam follower linkage operated by the cams and effective to control the operation of the loop-forming mechanism of the present invention.

The vibrator hopper 35 is mounted at one end of the base plate 25 by any suitable means, such as the mounting bracket 27. Any one of a number of vibratory hopper feeders could be used, but the one heretofore used with complete satisfaction for a wide range of spring sizes and types, has been the "Syntron" Model EB-00. Such a vibratory hopper feeder is described in the article by Woerner McKinsey, Jr., and John P. Moran in the May 1957 issue of "The Tool Engineer." Such a vibrator hopper broadly comprises an electromagnet, not specifically shown herein, but contained within the casing 36 (FIG. 2) which is mounted upon the bracket 27; and a bowl 37 mounted upon the base casing 36 by diagonally inclined leaf spring legs 38. The energizing of the electromagnet pulls the bowl downwardly toward it, i.e., toward the casing 36. Movement of the bowl is permitted by the mounting, for the springs will bend from the force of the electromagnet, imparting a rotary, as well as vertical, motion to the hopper bowl 37. The bowl is provided with a spiral lamp 39 leading from the floor of the bowl to a discharge orifice 40. A suitable gate 41 is mounted on the side of the ramp 39, adjacent the discharge orifice 40, in order to limit the feed to the discharge orifice to a single line of items (in this case, springs), each axially aligned with the others. When the feeder is operated by conventional A.C. electric current, the vibratory feeder above-mentioned will have a vibration frequency of approximately 3600 v.p.m. The operation of the electromagnet is controlled by a control box 45 which contains a half-wave selenium rectifier, not shown, and a rheostat-type switch 46 which controls the amplitude of the vibration and hence adjusts the feeder for different sizes of items to be fed, the frequency remaining substantially constant throughout. The high frequency of vibration of the hopper causes the parts to be fed (in this case, springs) to flow up the ramp somewhat like a fluid. The gate 41 forces the springs into a single line of axially aligned springs, and returns all those lying crosswise to the interior of the hopper, as is well known.

A conduit tube 50 leads from the discharge orifice 40 of the hopper. This conduit may be of any suitable material, such as a light metal tube, loosely inserted into the discharge orifice, for there will be relative vibration between this conduit and the hopper. The conduit 50 discharges into a trough 51 secured to a mounting plate 52 of a vibrating trough feeder 53. The vibrating trough feeder can be of any suitable type, the "Syntron" Model F-0 having proven very satisfactory. The construction of this feeder is similar to that of the feeder 35, comprising a base casing 54 in which is mounted an electromagnet, not shown; a vibrating member trough supporting bracket 55 mounted on the base casing by suitable spring legs, not shown in the drawings—the core of the electromagnet being attached to one of the legs. The cyclic energizing and de-energizing of the electromagnet causes the vibration of the vibrating member at approximately the rate of 3600 v.p.m. This vibrator is controlled by a suitable controller 56, likewise provided with a half-wave selenium rectifier, not shown, and a rheostat adjusting switch 57. This switch controls the amplitude of the vibration in the vibrator, although the frequency remains substantially constant.

This vibrator is similar in construction to that of the hopper feeder, except that its vibration is in a single plane—in the present instance in the plane substantially at right angles to the mounting plate 52 and trough 51. The trough 51 is set at an angle leading downwardly so that springs entering therein tend to slide from the force of gravity, the vibrator operating in a plane substantially perpendicular thereto in order to impart rotary motion to the springs as they pass down the channel. This trough is substantially an enclosed conduit in order to prevent piling of the springs one upon another, but is provided with a narrow slot 58 to enable an adjustable catch to be inserted therein to catch and hold the springs until a feed into the forming element is necessary.

The mounting plate 52 supports three turrets: a first forming turret 64, a reversing turret 80, and a second forming turret 90, all of which are rotatably mounted on the plate. The first forming turret 64, which is the turret to first receive an unlooped spring, is rigidly mounted on a shaft 65 journalled in the mounting plate (see FIG. 4). The axis of shaft 65 intersects the extended axis of the circular trough 51 in the full-cycle, or home, position of the turret. This turret 64 is provided with a central bore 66 (see FIG. 7), which, in the full-cycle, or home, position of the turret, is axially aligned with the central bore of the circular trough 51. Thus, a spring 67 passing down of the trough 51 will enter the bore 66 in turret 64. In order to facilitate the entry of a spring 67 into the bore 66, it is preferred that the end adjacent the trough 51 be flared, or chamfered, as shown at 68. An anvil member 69 is rigidly mounted on the turret 64 by any suitable means, such as screw stud 70, as shown in FIGS. 7 to 12. This anvil is formed with a central recess 71 which is aligned with the bore 66, the width of the recess being approximately three-fourths of the diameter of the spring to be looped. A pair of shoulders 72 and 73 (see FIG. 3) flank the recess 71, these two shoulders being spaced from the end of the bore 66 by shoulders 74 and 75, respectively, which permit one turn of the spring to extend beyond the bore. It will be seen, by reference to FIG. 3, that the shoulder 74 on flank 72 is smaller than shoulder 75 on flank 73. Actually, the shoulder 74 is spaced from the end of the bore 66 a distance equal to approximately one-half the diameter of the wire from which the spring is formed, while the shoulder 75 is slightly more than the full diameter of the spring wire. It will be recalled that the vibrator 53 is vibrating in a plane perpendicular to the path of travel of the spring through trough 51 and bore 66, and, in the construction heretofore used, this vibration rotates a spring in a clockwise direction as it passes down the trough from right to left. When the spring reaches the end of bore 66 and passes therefrom, the end of the spring loop passes between the shoulder 75 and the wall of the turret, and comes to rest against the side of the shoulder 74, the latter shoulder being so close to the turret as to prevent rotation of the spring. By this means, there will be one full turn, and only one turn, of the spring outside of the bore 66, and the end of that spring will always abut the shoulder 74. When this position is reached, vibration is temporarily stopped (as will hereinafter be explained), and a loop-forming tool operated (as will be explained immediately following the description of the remaining two turrets) to form a loop in the spring, as best shown in FIG. 8.

The second, or reversing, turret 80 is rigidly mounted on a shaft 81 (see FIG. 4), likewise journalled in the plate 52, and lying parallel to shaft 65. Preferably the shaft 81 lies below shaft 65, separated therefrom by a distance slightly in excess of the diameter of the turrets; and forming with shaft 65, a plane substantially perpendicular to the axis of trough 51. It can be mentioned at this point that all of the turrets at the midpoint of a cycle, are rocked through an angle of approximately 90° to rock them from the position shown in FIGS. 7 and 8 to that shown in FIG. 9. This turrent is likewise provided with a central bore 82, which, in the full-cycle, or home, position of the turret, is parallel to the bore 66; and in the half-cycle position, is axially aligned with the bore 66, as shown in FIG. 9. This bore is also flared, as at 83, at its inlet end, to provide ready access of springs from the bore 66.

The third, or second forming, turret 90 is mounted forwardly of the turret 80, and is rigidly mounted on a shaft 91 (FIG. 4) journalled in the mounting plate 52. The axis of this shaft, which is parallel to the other shafts 65 and 81, lies on the axis of the bore 82 of turret 80 when the turrets are in the full-cycle, or home, position. This shaft 91 is likewise spaced from shaft 81 by a distance slightly in excess of the diameter of the turrets. This third turret 90 is provided with a central bore 92, the inlet end of which is flared, as at 93, in order to more readily receive springs passed thereto by the turret 80. The turret 90 is also provided with an anvil 94 mounted on the turret by any suitable means, such as screw stud 95. This anvil is similar in all respects to anvil 69 mounted on the turret 64, and will, therefore, not be described again.

In the preferred form of construction, a solid guide plate 100 is mounted on the mounting plate 52, the guide plate being recessed, as shown in FIGS. 2 and 7 to 12, to embrace approximately one-fourth of turret 64, three-fourths of turret 80 and one-fourth of turret 90. This guide plate is mounted on the mounting plate by any suitable means, such as screws 101, as shown. The recesses of this guide plate are so arranged that as the three turrets are rocked from the full-cycle position shown in FIGS. 2, 7, 8, 10 and 11 to the half-cycle position shown in FIGS. 9 and 12, a spring 67 is retained in the bore of its respective turret while the turret is turning. Then, when the half-cycle position is reached, the spring is enabled to pass through a suitable guide aperture, such as 102, between turret 64 and turret 80, or 103, between turret 80 and turret 90. It is seen by comparison of FIGS. 8, 9 and 10, that the spring 67 lying in turret 64 in FIG. 8, is reversed when it is received in turret 90, as shown in FIG. 10, so that a spring loop may be formed on the opposite end. Then, in the second cycle of the machine, upon the second rocking of the turret to the half-cycle position shown in FIGS. 9 and 12, this spring, looped at both ends, is enabled to drop from the bore of turret 90 into a receiving box, not shown.

The mounting plate 52 is also provided with a pair of heavy brackets 109 and 110 (see FIG. 7) which are adapted to form a strong stop for the anvils 69 and 94, respectively, when the turrets are in the home position, thereby holding the anvils and the respective turrets in the full-cycle position against the force of the forming tools during the loop-forming operation.

The feed of unlooped, formed springs to the first forming turret is controlled by a feeding mechanism, best shown in FIG. 2. This mechanism is operated by a pin 76 (see FIGS. 2 and 7) on the inner side of the turret 64. When the turret is rocked, this pin engages the forward, or free, end of a feed lever 115 pivotally mounted on the mounting plate 52, as by stud 116. The lever is resiliently biased into engagement with the pin 76 by any suitable means, such as spring 117. This lever is provided with an elongated slot 118 which embraces a small bolt 119 adapted to clamp a latch arm 120 on to the lever 115, which is thus adjustable lengthwise of the lever 115. The lower end of this latch lever 120 is provided with a series of teeth 121, as shown in FIGS. 7 to 12, adapted to engage the turns of springs being fed in the machine. This stop arm 120 is so set that one, and only one, spring 67 lies between it and the periphery of the first turret 64, as shown in FIG. 9. In the home position of the turrets, this latching lever is adapted to engage the spring, as shown in FIGS. 7 and 10, the lower end of the arm lying within the slot 58 formed in the upper part of the trough. When the pin 76 engages the arm 115 (see FIG. 9), the turret has turned so that the bore is no longer aligned with the trough 51 and a spring 67 cannot pass from the trough. In that event, the locking arm 120 is lifted, allowing the springs to slide forwardly, or to the left in these figures, until they are lying, one against another, with the foremost lying against the periphery of the turret 64. Then, as the turrets return to their full-cycle position, the arm is dropped, thereby engaging the second spring so that when the full-cycle position is reached, only the first spring 67 is permitted to pass into the bore 66 of turret 64.

The means for oscillating, or operating, the turrets 64, 80 and 90 is best shown in FIGS. 1, 2 and 5. This mechanism is driven by an electric motor 125. A pulley 126 on the armature shaft of the motor is connected to a pulley 127 on a gear box 129 by a suitable belt 128. The gear box contains suitable reducing gears to prive an output shaft 130. This output shaft carries two cams; turret operating cam 131, shown in FIG. 5, and forming tool operating cam 203, shown in FIGS. 2, 4 and 5. The turret operating cam 131, as shown in FIG. 5, has a lobe 132 extending approximately one-third of the way around the periphery of the cam, with rather sharp flanks on each end thereof, the balance of the cam being of uniform radius.

The periphery of the cam 131 is engaged by a roller 138 mounted on a cam follower arm 139. The arm is pivotally mounted on a bracket 140 rigidly secured to the base plate, the arm being mounted on any suitable means, such as shaft 141. This follower arm is biased into engagement with the periphery of the cam 131 by any suitable spring, such as the relatively strong tension spring 142 tensioned between a spring seat on the arm and a complementary spring seat formed on the motor mounting bracket 133.

The upper end of the arm is pivotally secured to a switch block 148 by any suitable means, such as stud 149. This switch block 148 is provided with a longitudinally extending bore 150, shown in FIG. 6, through which extends an operating bar 151. One end of this operating bar is pivotally connected to a bellcrank 152, shown in FIG. 4, by any suitable means, such as pin 153. The bellcrank 152 is rigidly mounted on the shaft 91, so that turret 90 is driven directly by the reciprocation of bar 151, which normally follows oscillation of the cam follower arm 139. A pair of springs 154 and 155 are mounted on the operating bar 151, one on each side of the switch block 148. These springs are moderately strong compression springs, each engaging the switch block 148 at the center and engaging respective adjusting nuts 156 and 157, respectively. These adjusting nuts 156 and 157 are so set that they hold a reduced portion 158 of the bar 151 (see FIG. 6) within the bore 150 and hold the cam follower lever 139 and its roller 138 against the periphery of the cam 131.

A second bore 159 in the block 148 intersects the bore 150 and contains a switch-operating plunger 160 therein. This plunger is resiliently biased into engagement with the operating bar 151 by any suitable means, such as compression spring 161. In the event a spring becomes jammed between one of the turrets and the guide plate 100, the back-pressure on operating bar 151 will cause the spring 155 to yield, whereupon the operation of the cam follower arm 139 pushes the switch block 148 (to the right in FIG. 6 or to the left in FIG. 4), so that the switch plunger 160 rides off the reduced portion 158 and upon the enlarged portion of the bar 151. When that occurs, the plunger is forced upwardly and makes the contacts of a normally open micro-switch 162, thereby stopping the machine, as will hereafter be described in connection with FIG. 15, which relates to the wiring diagram of the present embodiment of my machine.

It will be seen by reference to FIG. 4 that the bellcrank 152, which is rigidly mounted on shaft 91, is also connected by a suitable linkage to the other turret shafts 65 and 81. The linkage which connects shaft 91 to shaft 65 may comprise an arm 170 rigidly mounted on shaft 91, the outer end of which is pivotally connected to an adjustable link 171. The other end of this link is pivotally conected to an arm 172 rigidly secured to shaft 65. Hence, the two shafts 91 and 65 rotate in unison, and in the same direction. The bellcrank 152 is connected to the shaft 81 through a linkage which comprises a link 173 pivotally connected to the other arm of bellcrank 152, the other end of the link being pivotally mounted on an arm 174 which is rigidly mounted on the end of shaft 81. This linkage provides means whereby the shaft 81, and hence turret 80, is rotated in a direction opposite to that of shafts 65 and 91, but in unison with the other two.

Normally, it will be desired to have a count of the springs looped in the looping machine, and this can readily be secured by means of a conventional counter 180 (FIGS. 1 and 2), which may be of an convenient design, preferably one of the well-known Veeder-Root counters. This counter can be mounted on the motor mounting bracket 133 and operated by a loose spring 181 connected to the arm 139 and the counting arm of the counter. Thus the oscillation of the arm 139 will operate the counter 180 to count the number of cycles of machine operation, and hence the number of springs looped by the machine.

The loops are formed in the springs by means of a pair of looping, or forming, tools 187 and 188 (FIG. 7) associated with the forming turrets 64 and 90, respectively. The looping tools are rigidly mounted on respective shafts 189 and 190 journalled in bearings in the mounting plate 52 and in brackets 191 and 192, respectively. The looping tools are identical in shape and hence only one need be described. Each forming tool comprises a pair of arms rigidly mounted on the respective shafts 189 and 190. The outer end of each tool mounts a loop-forming nose 193, as best shown in FIG. 7, rigidly secured between the two arms by any suitable means, such as screws 194. The width of the loop-forming nose is almost that of the recess 71 of the respective anvil, so that it substantially fills the recess but can enter the recess without engaging the shoulders 72 and 73. The outer edge of the forming tool is convex, as shown at 195, having a radius circumscribed about the axis of the shaft on which it is mounted substantially, but not quite, the distance between the axis of that shaft and the outer periphery of the associated turret. A deforming plate 198 is mounted on the outer face of the nose, extending laterally over, and slightly beyond, the adjacent arms, which plate has a forwardly projecting shoulder extending ahead of the sides of the arms, as shown. This shoulder is important in forming a sharp bend between the loop and the adjacent coil, so that the loop extends axially of the coiled spring and perpendicular to the adjacent coil. Incidentally, the shafts 189 and 190 preferably lie in the axis of the bores 66 or 92, respectively, of the turret with which the looping tool is associated, so that when the turrets are in their home position and the looping tools are in their operated position, the convex edges 195 of the loopers will engage the edges of the respective bores. The inner edge of the looper nose 193, at its forward end, is formed as a concave surface 196, the two surfaces 195 and 196 intersecting in a very sharply pointed nose 197. When the turret is in its full-cycle position, as is seen in FIGS. 8 and 11, and the looping tools 187 or 188 are operated, the sharply pointed nose 197 enters between the coils of the spring between the first and second turn, as shown in these figures. In this situation, the convex face 195 bears against the second turn of the spring and prevents any movement of the spring forwardly in its bore. Simultaneously, the concave face 196 bears against the inside of the first turn and bends it downwardly against the associated anvil 69 or 94, respectively, to form a loop consisting of the first turn of the spring, and only the first turn. It should be mentioned at this point, that the vibrator 53 is not operating at the time the forming tool engages the spring to form the loop, as at the instant the tools start their oscillation, or operating stroke, a stop switch, to be described in connection with the drive mechanism for the forming tools, breaks the flow of current to the vibrator 53.

The two forming tools 187 and 188 are operated in unison, being rocked from the position shown in FIGS. 2, 7 and 10 to that shown in FIGS. 8 and 11 by means which will now be described. A second, or tool operating, cam 203 (FIGS. 2, 4 and 5) is mounted on shaft 130 adjacent the cam 131. This cam is preferably formed as a face cam with a groove 204 in one face thereof. This groove, as is best shown in FIG. 4, is of substantially constant radius through an angle of approximately 300°, with a lobe, or rise, 207 of approximately 60°. A follower roller 205 rides in the groove, this roller being mounted on a short cam follower arm 206. This arm is rotatably mounted on the shaft 141 adjacent the follower arm 139 already described.

The upper end of the follower arm 206 is pivotally connected to an adjustable link 212, and the link, in turn, is pivotally connected to a bellcrank 213 rigidly mounted on the shaft 190, as shown in FIG. 4. The other arm of the bellcrank 213 is likewise connected to an adjustable link 214, the other end of which is connected to an arm 215 rigidly mounted on the shaft 189. Thus, both shafts 189 and 190, and consequently the looper tools 187 and 188, are rocked (counter-clockwise in FIG. 4 or clockwise in FIGS. 2, and 7 to 12) synchronously by means of the cam 203.

It has already been mentioned that it is desirable to stop vibration of the vibrating feeder 53, and hence the mounting plate 52 and the parts mounted thereon, while the loop is being formed. This is readily accomplished by means of a cutout switch 221 mounted on the base plate by any suitable means, such as bracket 222, and operated to break the circuit to vibrator 53 as the loopers 187 and 188 start their operation. This cutout is best controlled from the operation of cam 203, and most easily by means of an adjustable screw 223 mounted on the control arm of the normally closed micro-switch 221, the forward end of the screw bearing against the edge of the arm 206. Thus, as the arm 206 starts its oscillation to control operation of the forming tools 187 and 188, the normally closed cutout switch 221 is opened to break the circuit to the trough vibrator 53, so that it will remain at rest and the springs in the respective turrets 64 and 90 will be held rigidly while the forming tools are operating.

The timing of the operation of the turrets and the forming tools is best shown in FIG. 5, which shows the relative positions of the lobe 132 of cam 131 and lobe 207 of cam 203. In each instance, there is the major portion of each cycle in which the respective turrets and forming tools are in their home positions shown in FIGS. 2 and 7. During this period, the vibrator 53 is functioning to rotate the springs 67 in the turrets (clockwise as they pass from right to left in the embodiment shown in FIGS. 2 and 7 to 14), so that the helical springs in turrets 64 and 90 are rotated until the end of the first turn lies against the shoulder 74 and only one turn is permitted to lie outside of the bore 66 by the depth of shoulder 75 (FIG. 3). Then the follower roller 205 engages the lobe 207 of cam groove 204, rocking the follower arm 206 (counter-clockwise in FIG. 4 or clockwise in FIG. 2), thereby rotating the shafts 189 and 190 in the same direction, and simultaneously opening the cutout switch 221 to stop operation of vibrator 53. This rocking, or oscillation, of the shafts 189 and 190 moves the respective forming tools 187 and 188 from the position shown in FIGS. 7 and 10 to that shown in FIGS. 8 and 11, thereby forming a loop on the spring in the associated turret. Then, as the forming tools return to their home position, the cutout switch is closed to enable operation of the vibrating trough feeder 53, and the follower roller 138 (FIG. 5) engages the lobe 132 of cam 131. The engagement of roller 138 with lobe 132 rocks the follower arm 139 (counter-clockwise in FIGS. 4 and 5) to rock the shafts 65 and 91 in the same direction and the shaft 81 in the opposite direction. This causes the turrets 64 and 90 to rock (clockwise from the position shown in FIG. 8 to that shown in FIG. 9), and the turret 80 to rock counter-clockwise from the position shown in FIG. 8 to that shown in FIG. 9. During this operation, vibration of vibrator 53 has been resumed as the cutout switch 221 returns to its closed position as soon as cam follower arm 206 returns to its normal position. Thus, when the turrets reach the position shown in FIG. 9, the vibration of the mounting plate 52 causes the spring looped in turret 64 to fall backwards out of bore 66 through the aperture 102 in the guide plate, and into bore 82 of turret 80—the spring falling to the end of the bore where it is caught by the guide plate and held within the bore. Simultaneously, the pin 76 on turret 64 has lifted the feed arm 115, so that catch 120 has released the springs in the trough 51 and thereby enabled the springs to feed forwardly until the first one engages the periphery of the turret 64. Then, after a short interval controlled by the length of lobe 132, the turrets are returned to their original position, passing from the position shown in FIG. 9 into that shown in FIG. 10. In this return operation, the turrets 64 and 92 are rocked counter-clockwise in FIG. 9 and turret 80 is rocked clockwise, to return them to the position shown in FIG. 10. With this operation, the feed finger 115 and catch 120 are enabled to drop into the trough 51, whereupon the catch 120 engages the second spring in line to hold it, and all behind it, from entering turret 64. The first spring in the trough is thus freed for passage through bore 66, and it is fed forwardly through that bore until stopped by the anvil 69. Simultaneously, with this feed of the spring through bore 66, the vibration of the mounting plate 52 from the vibrator 53 has caused the spring passed from turret 64 to turret 80 to be fed forwardly through aperture 103 in the guide plate, into bore 92 of turret 90, the operation being effective to reverse the spring in bore 92 with respect to what it was in bore 66, so that the looped end lies to the rear and the unlooped end lies against the anvil 94. Then, in the second cycle of operation, the forming tools operate as before, moving from the position shown in FIGS. 7, 9 and 10 to that shown in FIGS. 8 and 11, thereby forming the first loop on the spring in bore 66 and the second loop on the spring in bore 92. Then, as the looping tools are withdrawn and the turrets oscillated, the spring in bore 92 is dropped, as shown in FIG. 12, into some suitable receptacle, not shown, while that having one loop formed in bore 66 is dropped into turret 80, and the cycle is repeated.

It will be obvious that the size of the bores may be adapted for any spring. It has been found that best results are secured when the diameter of the bore is roughly ten percent greater than the diameter of the spring. Length, of course, is not important so long as the spring is not longer than the length of the bore, or the diameter of the turret. However, the diameter of the spring is somewhat more critical, but it has been found that the diameter of the bore may vary over a considerable range so long as the fit of the spring in the bore is not too tight to permit it to move in the bore.

It has been found, particularly in springs of smaller diameter and formed of smaller wire, that occasionally a loop may be deformed during the looping phase of the operation, so as to prevent the spring from falling out of the bore as the turrets are rocked. For these smaller diameter springs, it is therefore desirable to have a cutout switch associated with each of the turrets 64 and 90 and operated by a spring lying within the bore. This can readily be accomplished by means of normally open micro-switches 230 and 231 associated with the turrets 64 and 90, respectively, shown in FIGS. 13 and 14, interposed in a normally open emergency cutout circuit (as shown in FIG. 15). These switches can be mounted upon any suitable bracket, such as 232 and 233, respectively, and are operated by arms 234 and 235, respectively. Normally, the operating arms 234 and 235 are spring-biased by springs, not shown, but contained within the microswitches 230 and 231, to the position shown in FIG. 13, or in connection with turret 90 in FIG. 14. In this position, the switches are open, the emergency circuit is open, and the flow of power to the motor is uninterrupted. These operating arms 234 and 235 project downwardly into slots 236 and 237 formed in the periphery of the turrets 64 and 90, and running into the bores 66 and 92, as shown in these figures. So long as the operating arms lie in the position shown in FIG. 13, the flow of power to the motor is uninterrupted. However, if a loop is deformed so that the spring does not readily leave the bore and pass into the next turret, as is shown in connection with the spring in turret 64 in FIG. 14, the spring engages the end of the operating arm (arm 234 in this instance), rocking the arm to its switch-closing position. In that event, the emergency circuit is closed to operate a relay which opens a switch in the motor circuit, and the flow of power to the motor is interrupted, so that the motor stops and a warning circuit is energized to warn the operator of the fact that the deformed spring is interfering with proper operation of the machine.

It has been found that the ease of forming loops by the machine of my invention is somewhat dependent upon the mass, or weight, of the spring, as well as upon its size. For example, springs formed out of wire of a diameter of .014 inch, the spring having a diameter of approximately one-eighth inch and about one-half inch long, can fit rather loosely in the respective bores and do not require the cutoff switches 230 and 231. However, a spring formed of wire of a diameter of .008 inch, a diameter of less than one-tenth of an inch and a length of about eleven-hundredths of an inch, requires a closer fit in the bore and also requires the cutoff switches 230 and 231. In the latter case, the machine is operated at approximately thirty cycles per minute.

In connection with the small springs just mentioned, it was found desirable to provide air injection means to blow the small springs through their respective bores—their weight being so little that gravity was not sufficient. In that case, air injection nozzles were placed at the inlet end of bores 66 and 82 when the turrets are in their home positions shown in FIGS. 8 and 11, and at the anvil ends of bores 66 and 92 in the half-cycle position shown in FIGS. 9 and 12. This mechanism will be described in detail in connection with the second embodiment of my machine (FIGS. 16 to 19), but it can be noted that they are operated by a suitable switch controlled from the cam shaft to release air under pressure when the turrets are rotated to the respective positions shown in the figures mentioned.

It has also been found in connection with the various small springs of the minimum size above-mentioned, that when these springs are formed of steel wire, they tend to become slightly magnetized in the spring-forming operation, i.e., in the operation in which the wire is wound to form the unlooped springs. These magnetized springs, owing to the extreme lightness of the wound springs, tend to adhere to the walls of the respective bores. It was, therefore, found desirable to demagnetize these springs before feeding them into the trough 51. This could be done by placing them in a demagnetizing coil before dumping them into the hopper 37 of the vibrator hopper 35. However, it was found more desirable to demagnetize them by a demagnetizing coil 245 as they passed through the conduit 50 from the hopper 37 into the trough 51, as indicated in FIG. 2. This demagnetizing coil is operated by alternating current under suitable voltage, either from normal 110 volt current used in the motor supply or a reduced voltage alternating current, as preferred.

The wiring diagram for the present invention is shown in FIG. 15. Power can be furnished at any suitable voltage, such as 110 volts, through power lines L–1 and L–2. A main switch 250 controls the flow of power to the mechanism. One of the power lines, such as L–1, leads to a binding post 251, which is connected to the motor 125 by a suitable conductor 252, and to a light 254 and a bell 255 by a conductor 253. The main switch 250 is connected to the motor through conductor 256, normally open switch 257 (operated by low voltage relay 270), conductor 258, normally closed double throw switch 259, and conductor 260 to the motor. Thus when the main switch 250 is closed by the operator and switch 257 is closed by the closing of the start switch 277, power goes to the motor and it is operated. At the same time, and simultaneously therewith, conductors 265 and 266 leading from L–1 and conductor 258, respectively, lead to the controllers 45 and 56 of the vibrators, which are placed in parallel in this circuit. In the event the demagnetizer 245 is used, it is also placed across the conductors 265 and 266 so that it would be in parallel with the two controllers. It will be recalled that the controller 45 controls the operation of the vibrating hopper feeder 35 and that the controller 56 is first connected to the switch 221 operated by the cam 203 and thence to the vibrating trough feeder 53. This latter connection is provided so that the trough vibrator will be at rest at the time the forming tools 187 and 188 start their operation. By this means, the motor 125 and the two vibrators 35 and 53 and the demagnetizer coil 245 are placed in operation by the closing of switches 250 and 257.

It has also been mentioned that the controllers 45 and 56 operate on normal current, such as 60-cycle 110 volt current, and provide half-wave rectifiers which permit the flow of the alternating current in one direction only.

Preferably, the starting, stopping and resetting circuit, which controls the operation of switch 257, is controlled by a low voltage relay 270. This can readily be secured by means of a low voltage transformer 271 connected to the power line L–1 and 256 and hence in parallel to the motor 125. The relay 270 is connected to the transformer 271, on one side by conductors 272 and 273, while the other side is connected to conductors 274, 275 and 276 to normally open starting switch 277, and then by conductor 278. Thus, the closing of the starting switch 277 forms a closed circuit including the transformer 271 and relay coil 270. The normally open switch 257 is mounted on the armature 279 of relay 270 and hence is closed by the closing of the circuit connecting the relay to the transformer. When the relay is operated to close switch 257, it simultaneously closes a holding circuit including conductor 285, relay operated switch 286 mounted on the armature 279, conductor 287, normally closed stop switch 288, conductor 289, normally closed reset switch 290 and conductor 291 which connects to the conductor 278, previously mentioned. Thus, the energizing of the relay 270 closes the holding circuit, including switch 286, and maintains the relay energized and the control circuit, including switch 257, operative.

The motor and cam can be operated under manual control, without establishing the holding circuit, when necessary to adjust the cams or parts of the mechanism. This can be secured by the operation of the normally closed double-throw resetting switch 290, just mentioned. One side of this switch is connected by conductor 297 to line 276 and the other side by conductor 298 to the conductor 278. When this switch is thrown to its other position, in which it connects conductors 297 and 298, it supplies power to the relay 270 and hence operates the control switch 257. While this operation closes switch 286, the holding circuit is not established as the resetting switch 290 breaks the connection between conductors 289 and 291. When this switch is operated, the operation is directly under control of the operator and the holding circuit is not established.

A low voltage cutout circuit is also provided to automatically open the normally closed switch 259 and energize the warning circuit of conductor 253, light 254 and bell 255. This circuit includes a relay 305 operating two switches, one of which is the motor switch 259 already mentioned. One side of the relay 305 is connected by conductor 306 to conductor 273 leading to the transformer 271. The other side of the relay leads through conductors 312 and 307 to the cutout switches 230, 231 and 162, already mentioned. It will be recalled that these switches are operated by the arms 234 and 235 (FIGS. 13 and 14) and the plunger 160 (FIG. 6), respectively. These three switches are mounted in parallel between the conductor 307 and a conductor 308 which leads to conductor 275 on the other side of the transformer 271. Hence, the operation of any one of these three switches closes a circuit including the relay 305, thereby retracting armature 309 and moving switch 259 to break the connection with motor conductor 260. The switch 259 is a double throw switch, so that the retraction of the armature causes it to engage the other contact of the switch, which is connected to the conductor 253 and hence to the bell 255 and light 254 to establish the warning circuit.

The energizing of relay 305 also establishes a holding circuit to hold the warning circuit closed until the stop switch 288 is operated. This holding circuit includes a conductor 310 connected to conductor 287 leading from switch 286; switch 311 mounted on armature 309; and conductor 312 leading to conductor 307. The closing of switch 311 establishes a holding circuit for relay 305, including the conductor 306, relay 305, conductor 312, switch 311, conductor 310, switch 286, conductors 285 and 274, back to the transformer 271.

Whenever one of the cutout switches 230, 231 or 162 is operated, the motor is stopped by the operation of relay 305 moving switch 259 to close the warning circuit. The warning circuit includes the light 254 and bell 255, and this circuit remains operative until the operator manually operates stop switch 288 to break the circuit energizing relay 270. The operation of this switch breaks the flow of power to the relay 270, whereupon normally open switch 257 returns to its normally open position and the power supply to the motor, and the warning circuit is broken. When this happens, switch 286 is also moved to its open position, so that relay 305, is de-energized and switch 259 returns to its normally open position in which it is connected to the motor 125. The machine can be manipulated through operation of reset switch 290 until the cause of the trouble which operated the cutout switches, is removed. Thereupon, the starting switch 277 can be closed, which re-establishes the power connections to the vibrators and the motor, as previously described.

The machine described in the first embodiment has proven very satisfactory for larger springs used in business machines, such as those which are formed of a wire of a diameter of .014 inch, or larger, having a diameter of approximately one-eighth of an inch, or more, and at least one-half of an inch long. However, for very light springs, such as those formed of a wire of a diameter of .008 inch, a diameter of less than .100 inch and a length of approximately .110 inch, their very lightness interfered with the free flow of the coil springs to the forming anvils. Apparently the mass of the spring is an important factor in the rapid feeding of the spring to the anvil, so that with very light springs the force of gravity, even when assisted by vibration, was overcome by friction or the adhesion of the spring to the conduit. This difficulty could be avoided in the first-described form only by slowing down the machine, or running the risk of improperly looping the springs. In order to avoid the difficulties of this first form with very light springs, it was found advisable to use jets of compressed air to assist in the passage of the springs through the respective bores. However, it was found that by using the air injection means just mentioned and to be described in connection with this second embodiment, the springs, even the very smallest, such as the size mentioned above, would properly feed, even when the machine operated at a speed of approximately thirty cycles per minute.

In connection with the second embodiment, for purposes of illustration, I also show the other suggested means of mounting the forming turrets in the machine. In this embodiment, which is illustrated in FIGS. 16 to 19, inclusive, and in the wiring diagram of FIG. 20, the forming turrets only are mounted on the vibrators. The machine of this form is best constructed with two small vibrators in place of the large one in the first embodiment. This mounting has the advantage that the vibrators are required to move less mass than the vibrator 55 of the first embodiment, because thye are required to vibrate only the bores in the two forming turrets, and it has been found cheaper to supply two small vibrators in lieu of the one large one of the first form.

The mechanism of the present embodiment is mounted on a base plate 25 which can be similar in all respects to the base plate of the first form. The driving motor, which can be identical with the motor 125 of the first embodiment, and the associated drive mechanism, including the pulleys 126 and 127, the belt 128, the gear box 129, and the power shaft 130, can be identical with those respective parts illustrated in the first embodiment, and hence will not be described or shown (with the exception of the power shaft 130). The cams 131 and 203 for operating the forming tools and rotating the turrets can be identical with those shown in the first embodiment and particularly illustrated in FIGS. 4 to 6, and need not be described again.

In the construction illustrated in FIG. 16, the turrets are mounted on a relatively thin supporting plate 350 rigidly affixed to the base plate 25, as by being bolted to an auxiliary base plate 351 which is bolted to the base. Preferably, an auxiliary mounting plate 353 is mounted on the supporting plate 350 by any suitable means, such as machine studs 354. This auxiliary plate, which is best shown in FIG. 17, is considerably thicker than the supporting plate 350. This plate is desirable in order to provide sufficient thickness for the proper mounting of the forming tools and the respective turrets, and for that reason need only be large enough to encompass these portions of the mechanism. In the embodiment, the forming turrets 364 and 390, while lying in the exact position shown and described in connection with the first embodiment, are slightly different in construction, although the intermediate, or reversing, turret 80 can be exactly like that described in the previous form. An auxiliary plate 100, which can be identical in form with that shown in the first embodiment, partially embraces the three turrets, so as to hold the springs contained in their respective bores within those bores.

The forming turrets 364 and 390 preferably are identical in construction so that only one will need to be described. In the present form, as is best shown in FIG. 17, the turret 364 is formed as an annular disk mounted on a quill shaft 365, the shaft being rotatably mounted in a suitable bearing 363 rigidly fastened in the supporting plate 350 and 353. This turret is rotated by means of arm 172, shown and described in connection with FIG. 4. The turret itself does not vibrate. The bore 366 is contained within a small bar 362 rigidly mounted in a channel 361. A bar 360 is rigidly secured to the channel member 361 and extends through the bore of the quill shaft 365. A permanent magnet 359 is rigidly affixed to the inner end of the bar 360, which magnet is spaced a short distance from the electromagnet 377. The vibrating portion of the turret, which comprises the channel member 361, bar 360 and the conduit member 362, is supported for vibration in the turret member 364 within the quill shaft 365 by suitable leaf springs 379, one extending between the turret 364 and channel 361 and the other extending between the magnet 359 and a block 378 on the inner end of the quill shaft. Thus the vibratory assembly (i.e., the magnet 359, bar 360, channel 361 and bar 362) can vibrate freely with respect to turret 364 and can rotate freely with respect to the armature 377.

The electromagnet comprises, preferably, an E-shaped magnet, or armature, 377 with a coil 384 surrounding the central portion of the armature. This magnet can be supported by supporting plate 385 mounted on a flange 386 of vibrator supporting plate 352. It is obvious that as alternating current is supplied to the coil through the power line 387, it alternately attracts and repels the permanent magnet 359, and with the latter, also the bar 360, channel 361 and the bar 362 which contains the bore 366. The direction of vibration of this member has two components, horizontal, towards, or away from, the magnet, and vertical, due to the flexing of the springs 379, so that actually this vibrating assembly moves at a diagonal angle (downwardly and to the right in FIG. 17). This vibrating assembly is obviously free to rotate with respect to the coil and magnet which attracts or repels it, and hence rotates with the rotation of the turret 364.

The construction of the second forming turret 390 is identical to that of turret 364 and need not be described. The intermediate, or reversing, turret is identical with that of the first form and hence it need not be described. Also, the forming anvils 69 and 94 on the respective turrets 364 and 390 are identical with those described in connection with the first form, as are also the forming tools 187 and 188. These parts need not be described, nor need their operation be mentioned other than to point out that they are operated in exactly the same manner as those of the first form, having particular reference to FIGS. 4 to 6 for their construction and method of operation. The machine, therefore, operates through the same phases in each cycle of operation described in the first form, the only difference in the operation of the forming tools and the turrets being that only the bores of the forming turrets are vibrating, as contrasted to the whole assembly comprising the turrets and their mounting plate 52. Thus the vibrators, while requiring two in this form, can be much smaller and cheaper than that shown in the first form.

There are also shown in the drawings of the second embodiment, and particularly in FIG. 16, means for providing air injection to move the springs through their respective bores 366, 82 and 392. Preferably, the air is not supplied continuously to these bores, but only as momentary jets when the turrets are in their normal, or home, position, in which the springs are fed forwardly to the anvils, as shown in FIG. 16 or in FIGS. 7 and 8, and after they have been rotated 90° to the position shown in FIG. 9. The means for supplying air in the sequential jet operation desired will now be described.

Compressed air is supplied through an air line 400 leading into a control manifold 401 having two outlet ports 402 and 403. The air supply manifold 401 can be supported on the base plate 25 by any suitable means, such as bracket 404. Normally, the outlet ports 402 and 403 are closed by needle valves 410 and 411, as is best shown in FIG. 19, which close the apertures between the interior chamber 405 of the manifold 401 and the outlet ports. Both of these needle valves have an extended stem 412 and 413, respectively, which extend through the manifold, as shown in FIG. 19, and are utilized to provide means for opening the valves from the operation of a cam to be described in the next paragraph. The two needle valves are biased to their closed position by suitable springs 414 and 415, respectively, contained within caps 416 and 417.

The valves are operated in timed sequence by a cam 425 rigidly mounted on the drive shaft 130, the cam preferably being a circular plate mounted closely adjacent to the ends of the needle valve stems 412 and 413. A pair of cam projections 426 and 427 are mounted on the cam at a radius to engage the end of the stem 413 of needle valve 411 (FIGS. 16 and 19) at approximately diametrically spaced positions on the cam 425, at about the 90° and 270° positions of a cycle. A single projection 428 is mounted on the cam plate 425 at a radius such as to cause it to engage the end, or the stem, 412 of needle valve 410, and angularly spaced at about the 180° position of a cycle, or about halfway between the other projections.

A single air line 433 leads from the manifold outlet port 403 to an injection manifold 434 mounted on the auxiliary plate 100 by any suitable means, such as screws, not shown. This manifold has branched passageways 435, one branch leading to the upper and inlet end of the bore 82 of the turret 80 and the other branch leading upward to discharge into upper and inlet end of the bore 366 of the turret 364, when the turrets are in their home position shown in FIG. 16. Obviously, whenever either of the projections 426 or 427 engages the stem end 413 of the needle valve 411, the valve is pushed inwardly against the force of its spring 415, thereby permitting air in the chamber 405 of inlet manifold 401 to flow through the outlet port 403 and air pipe 433 into injection manifold 434. This provides two jets of air, one leading into the inlet end of the bore 366 of turret 364 and the other into the inlet end of bore 82 of turret 80 and thence into the bore 392 of turret 390 so that springs in the respective turrets are pushed through the bores to the respective forming anvils 69 and 94. The first jet occurs between approximately 60° and 90° of a cycle, starting shortly before and continuing until the forming tools complete their stroke at approximately the 90° position of the cycle, and again about 180° later when the turrets have been returned to their home position and a new spring is started into the bore 362, shortly after the time the latch 120 is operated to hold a second spring in the inlet channel 51. This latter jet is particularly effective in the aligned bores 82 and 392 to force the spring looped in turret 364 down against the anvil 94.

At approximately the midpoint of a cycle, just as the turrets are rotated 90° to the position shown in FIGS. 9 and 12, the needle valve 410 is operated by the cam projection 428 engaging the end of the stem 412 of the needle valve, thus permitting a jet of air to escape through the outlet port 402. This flow of air is divided in an outlet manifold 440, one line 441 leading to an injection manifold 442, and the second line 443 leading to an injection manifold 444. Both of the manifolds 442 and 444 have divided outlets 445 and 446, respectively, discharging along the axis of the bores 366 and 392 when the turrets are at the end of their stroke, shown in FIGS. 9 and 12; and 447 and 448, respectively, discharging at an angle therethrough, so as to discharge through the slot in the anvils 69 and 94 at the same time. The outlets 447 and 448 dislodge the loop spring from the respective anvils, while the outlets 445 and 446 direct the stream of air down the bore, so as to push the spring through the respective bores.

A wiring diagram for the circuitry of the second embodiment of my invention is shown in FIG. 20. Power can be supplied at any suitable voltage, such as 110 volts A.C., through power lines L–1 and L–2. A main switch 250 controls the flow of power to the machine. The motor 125, the feed hopper controller 45 and the two turret vibrators 356–a and 356–b are connected in parallel with the power lines L–1 and L–2 through suitable conductors 459 and 460. One terminal of the motor 125 is connected to conductor 459 by conductor 461, normally open switch 257, conductor 462, normally closed switch 259 and conductor 463. The other motor terminal is connected to line 460 directly by conductor 464. The cam operated switch 221 (operated by cam 203 on drive shaft 130) controls the flow of power to the two turret vibrators 356–a and 356–b, as previously explained.

The control circuits for the control switches preferably are operated at a low voltage and hence are supplied with power through a suitable transformer 271 connected between the power lines L–1 and L–2. A starting circuit, which controls the operation of normally open switch 257, is controlled by a normally open starting switch 277 that is manually operated by the operator. This switch is connected to one side of the transformer 271 by conductors 466 and 467. The switch is connected to the low voltage relay 270, the armature 279 of which controls the positioning of switch 257 by suitable conductors 468 and 469. The other side of the relay 270 is connected to the other side of the transformer by a suitable conductor 470.

The operation of the relay 270 closes a holding circuit, for the starting switch normally is immediately released by the operator. The holding circuit is controlled by a normally open switch 286 mounted on the armature 279 of the relay 270, so that the closing of the starting switch 277 and the operation of relay 270 closes this switch. This switch is connected by means of conductor 475 to conductor 467, and by means of conductors 476, 477, normally closed stop switch 288, conductor 478, normally closed resetting switch 290 and conductor 479, to the conductor 469 leading into the relay 270. Obviously the holding circuit can be broken by the manual operation of the stop switch 288, which breaks the holding circuit and therefore de-energizes relay 270 and causes the motor control switch 257 to be opened.

The resetting switch 290 is a double-throw switch normally biased to close the holding circuit, but subject to manual operation to close a resetting circuit, including the conductor 480 leading from conductor 466 through switch 290, and hence through conductors 479, 469 to the relay 270. This circuit, of course, is operable only so long as the switch 290 is held in its resetting position, and when released, cuts the flow of power to the relay 270, so that the relay becomes de-energized and switch 257 opens.

The control circuit also includes means for automatically terminating operation of the machine by the automatic cutout switches 230, 231 and 162, previously described, these switches being operated by the plungers 234, 235 and 160, respectively. These three switches are mounted in parallel and are connected by means of conductor 308 to the transformer power line 466. A conductor 307 leads from these three switches to a second relay 305, thence by conductor 306 to conductor 470. The armature 309 of the relay 305 is normally biased to hold the motor switch 259, which, incidentally, is a double-throw switch, to close the circuit to the motor. However, the operation of the relay 305 opens the circuit to the motor and closes a warning circuit 253 through switch 259, the warning circuit including the bell 255 and light 254 and thence back to the source of power. This warning circuit, of course, remains operative so long as the holding circuit for relay 270 remains unbroken, i.e., until the operator opens normally closed stop switch 288 to break the holding circuit.

A momentary operation of any of the three switches 230, 231 and 162 is effective to establish a holding circuit for relay 305. The armature of the relay 305 includes a normally open switch 311, one side of which is connected to conductor 485, which, in turn, is connected to conductor 307, while the other side of the switch is connected by conductor 486 to conductor 476. The closing of switch 311 hence holds the two relays 270 and 305 energized through the holding circuit, which includes conductors 466, 467, 475, switch 286 and conductor 476—one branch of this holding circuit including conductor 486, switch 311, conductor 485 and relay 305, while the other branch includes conductor 477, stop switch 288, conductor 478, reset switch 290 and conductors 479 and 469 to hold relay 270 energized.

It will be understood that the machines shown and described herein are preferred embodiments of my invention, and that the mechanisms shown are capable of considerable modification by a person skilled in the art without departing from the spirit or scope of the invention. It is to be understood, therefore, that the invention is not limited to the details above-described, but may comprehend such other mechanisms, or arrangement of details, or features, as may be consistent with the claims. In view of the prior art, either arrangement shown is capable of considerable modification by a person skilled in the art and any such modifications as are in keeping with the description of claims which follow, are considered to be within the present invention.

I claim:

1. A spring looping machine comprising a sloping conduit for feeding unlooped and axially aligned coil springs, means for delivering unlooped coil springs to the upper end of said conduit, magnetic vibrating means for vibrating said springs in a plane perpendicular to the axis of the conduit while passing through said conduit, anvil means cooperating with the other end of said conduit for holding a spring therein in a particular angular position and against rotation and simultaneously allowing a predetermined number of turns of said spring to extend beyond said conduit, a loop forming tool operative transversely of the axis of said spring as it lies in said conduit and engages said anvil to form a loop in the end of said spring, and means for operating said loop forming tool.

2. A spring looping machine comprising an inclined conduit for conducting unlooped and axially aligned coil springs, means for delivering axially aligned coil springs to an upper inlet end of said conduit, means for vibrating said conduit in a path perpendicular to the conduit and thereby rotating said springs while passing through said conduit, an anvil positioned adjacent the other end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of said spring to form a loop therein, and means for operating said forming tool.

3. A spring looping machine comprising a vibrating inclined trough feeder for delivering axially aligned and unlooped coil springs, means for delivering springs into the upper end of said trough feeder, an anvil adjacent the other end of said trough, said anvil having a shoulder adapted to engage the end of a turn of said coil spring and thereby to hold the spring against rotation and simultaneously allow a predetermined number of turns of said spring to extend beyond said conduit, a loop forming tool operative transversely of the axis of said spring to form a loop therein, means for operating said loop forming tool, a second conduit, an anvil adjacent the discharge end of said second conduit, said anvil having a shoulder adapted to engage the end of a turn of said coil spring and thereby hold the spring against rotation and simultaneously allow a predetermined number of turns of said spring to extend beyond said conduit, a second loop forming tool operative transversely of the axis of a spring in said second anvil to form a loop therein, means for passing a spring from said first anvil to said second anvil, and means for reversing said springs during said passage.

4. An automatic spring looping machine comprising a sloping conduit for feeding said springs in a single stream of axially aligned unlooped coil springs, means for feeding an axially aligned single stream of unlooped coil springs into the upper end of said conduit, a pair of looping turrets associated with said conduit, the first of said turrets receiving unlooped coil springs from said conduit and the second of said turrets adapted to receive springs having a loop formed in one end thereof from said first turret, normally sloping passageways in said turrets for passing springs therethrough, a looping anvil at the end of said passageways remote from the point of receiving springs, a pair of loop forming tools adapted to cooperate with the anvil of the respective turret and when operated adapted to pass between the first and second turns of the spring in the adjacent anvil, each of said anvils having a shoulder so constructed and arranged as to provide a stop on one side of the respective passageway against which the end of the spring can abut to limit rotation of the spring in said passageway and limit the forward progress of the spring out of said passageway for a distance equivalent to one turn of a spring, means for vibrating said passageways in a direction perpendicular to the axis thereof, a power means for sequentially oscillating said forming tools and for rocking said turrets through an angle sufficient to pass a spring with a loop formed in said turrets backwardly through said passageways, and conduit means for passing the spring with a loop formed in one end thereof in said first turret backwardly into said second turret whereby the unlooped end of the spring from the first turret is presented to the anvil and looping tool in the second turret.

5. A spring looping machine comprising a hopper for axially feeding aligned and unlooped coil springs, an inclined conduit for receiving one of the aligned and unlooped coil springs, means for delivering axially aligned springs from said hopper into the upper end of said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of a spring held by said anvil to form a loop therein, a second inclined conduit for receiving one of the springs, a second anvil having a shoulder adapted to engage the end of a turn of said coil spring and thereby hold the spring against rotation and simultaneously allow a predetermined number of turns of said spring to extend beyond said second conduit, a loop forming tool operative transversely of the axis of a spring held by said second anvil to form a loop therein, vibrating means for vibrating said conduits in a closed path perpendicular to the conduit and thereby rotating said springs while passing through said conduit, means for operating said forming tools, means for passing a spring from said first conduit to said second conduit, and means for reversing said springs during said passage from said first to said second conduit.

6. The apparatus of claim 5 wherein the vibrating means comprises a single vibrator and both conduits are mounted thereon.

7. The apparatus of claim 5 wherein the vibrating means comprises a pair of vibrators and each vibrator mounts one of said conduits.

8. A spring looping machine comprising a hopper for feeding unlooped and axially aligned coil springs, an inclined conduit for receiving unlooped coil springs, means for delivering springs from said hopper into the upper end of said conduit, vibrating means for vibrating said conduit in a closed path perpendicular to the conduit and thereby rotating said springs while passing through said conduit, an anvil at the lower end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of a spring in said conduit to form a loop therein, a second inclined conduit, a second vibrating means for vibrating said second conduit in a closed path perpendicular to the said second conduit and thereby rotating said springs while passing through said conduit, a cutoff switch for terminating operation of both of said vibrating means, an anvil at the discharge end of said conduit, said anvil having a shoulder adapted to engage the end of a turn of said coil spring and thereby hold the spring against rotation and simultaneously allow a predetermined number of turns of said spring to extend beyond said conduit, a second loop forming tool operative transversely of the axis of a spring in said second conduit for forming a loop therein, means for operating both of said forming tools, means for passing a spring from said first conduit to the upper end of said second conduit, means for reversing said springs during said passage, air injection means discharging into the inlet ends of said conduits, and means operated in timed relationship to the operation of said forming tools for operating said cutout switch and said air injection means.

9. An automatic spring looping machine comprising a sloping conduit for feeding said springs in a single stream of axially aligned unlooped coil springs, means for feeding an axially aligned single stream of unlooped coil springs into the upper end of said conduit, a pair of looping turrets associated with said conduit, the first of said turrets receiving unlooped coil springs from said conduit and the second of said turrets adapted to receive springs having a loop formed in one end thereof from said first turret, passageways in said turrets for passing springs therethrough, a looping anvil on each turret at the end of said passageway remote from the point of receiving springs, a loop forming finger adapted to cooperate with each anvil and when operated adapted to pass between the first and second turns of the springs in the respective anvil, each of said anvils having a shoulder so constructed and arranged as to provide a stop on one side of the respective passageway against which the end of the spring can abut to limit rotation of the spring in said passageway and limit the forward progress of the spring out of said passageway for a distance equivalent to one turn of a spring, means for vibrating the passageways in said turrets in a direction perpendicular to the axis of the passageways when in a loop forming position, a power means for sequentially oscillating said forming tools and for rocking said turrets through an angle sufficient to pass a spring with a loop formed in said turrets backwardly through said passageways, conduit means for passing the spring with a loop formed in one end thereof in said first turret backwardly into said second turret whereby the unlooped end of the spring from the first turret is presented to the anvil and looping tool in the second turret, means for terminating operation of said vibrating means during operation of said loop forming fingers to form a loop in the respective springs, and means for injecting air through said passageways in each extreme rocked position of said turrets.

10. A spring looping machine comprising an inclined conduit for conducting unlooped and axially aligned coil springs, means for delivering axially aligned coil springs to the upper end of said conduit, means for vibrating said conduit in a path perpendicular to the conduit and thereby rotating said springs while passing through said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of a spring in said conduit to form a loop therein, means for operating said forming tool, and means for terminating operation of said vibrating means in timed relationship to the operation of said forming tool.

11. A spring looping machine comprising an inclined conduit for conducting unlooped and axially aligned coil springs, means for delivering axially aligned coil springs to the upper end of said conduit, means for vibrating springs in said conduit in a closed path having both horizontal and vertical components in a plane perpendicular to the axis of the conduit and thereby rotating said springs while passing through said conduit, an anvil at the other end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of a spring in said conduit to form a loop therein, means for operating said forming tool, means for injecting air into the inlet end of said conduit, and means for controlling sequential operation of said vibrating means and said air injecting means.

12. A spring looping machine comprising an anvil adapted to engage the end of a turn of a coil spring and thereby hold the spring against rotation, a downwardly sloping conduit for feeding unlooped and axially aligned coil springs to said anvil, said anvil and the lower end of said conduit being so spaced from one another as to allow a predetermined number of turns of a spring in said conduit and engaging said anvil to extend beyond said conduit, means for applying transverse vibrational impulses to a spring within the conduit and thereby spinning said springs while passing through said conduit, a loop forming tool operative transversely of the axis of a spring in said conduit and cooperating with said anvil to form a loop in a spring engaging said anvil, and means for operating said forming tool.

13. A spring looping machine comprising an anvil adapted to engage the end of a turn of a coil spring and thereby hold the spring against rotation, an inclined conduit for conducting unlooped and axially aligned coil springs to said anvil, said anvil and the lower end of said conduit being so spaced from one another as to allow a predetermined number of turns of a spring in the conduit to extend beyond said conduit to engage said anvil, means for delivering axially aligned coil springs to the upper end of said conduit, means for vibrating said conduit in a plane perpendicular to the conduit and thereby rotating said springs while passing through said conduit, a loop forming tool operative transversely of the axis of a spring in the conduit and cooperating with said anvil to form a loop in a spring in said conduit and engaging said anvil, and means for operating said forming tool.

14. A spring looping machine comprising a sloping conduit for conducting unlooped and axially aligned coil springs, means for delivering axially aligned coil springs to the upper end of said conduit, means for vibrating said conduit in a path perpendicular to the conduit but having a vertical and a horizontal component and thereby rotating said springs while passing through said conduit, an anvil at the lower end of said conduit, said anvil having a shoulder adapted to engage the end of a turn of said coil spring and thereby hold the spring against rotation and simultaneously allow a predetermined number of turns of said spring to extend beyond said conduit, a loop forming tool operative transversely of the axis of said spring to form a loop therein, and means for operating said forming tool.

15. A spring looping machine comprising an anvil adapted to engage the end of a turn of a coil spring and thereby hold the spring against rotation, an angularly positioned conduit for conducting unlooped and axially aligned coil springs to said anvil, said anvil and the lower end of said conduit being so spaced from one another as to allow a predetermined number of turns of a spring in the conduit to extend beyond said conduit to engage said anvil, means for delivering axially aligned coil springs to the upper end of said conduit, means for vibrating springs in said conduit in a closed path having both vertical and horizontal components in a plane perpendicular to the conduit and thereby rotating said springs while passing through said conduit, a loop forming tool operative transversely of the axis of a spring in the conduit and engaging said anvil to form a loop therein, and means for operating said forming tool.

References Cited in the file of this patent

UNITED STATES PATENTS

| | | |
|---|---|---|
| 1,051,497 | Harter | Jan. 28, 1913 |
| 2,188,705 | Cook | Jan. 30, 1940 |
| 2,696,285 | Zenlea | Dec. 7, 1954 |
| 2,748,450 | Flaws et al. | June 5, 1956 |
| 2,815,519 | Friedman | Dec. 10, 1957 |

UNITED STATES PATENT OFFICE
CERTIFICATE OF CORRECTION

Patent No. 3,040,784                   June 26, 1962

Herbert Henry Ashley-Wing

It is hereby certified that error appears in the above numbered patent requiring correction and that the said Letters Patent should read as corrected below.

Column 3, line 44, for "lamp" read -- ramp --; column 6, line 30, for "prive" read -- drive --; column 7, line 33, for "an" read -- any --; column 12, line 64, after "305" strike out the comma; column 13, line 35, for "thye" read -- they --; column 17, line 67, strike out "to"; column 19, line 45, for "springs" read -- spring --.

Signed and sealed this 19th day of February 1963.

(SEAL)
Attest:

ESTON G. JOHNSON                  DAVID L. LADD
Attesting Officer                 Commissioner of Patents